Dec. 28, 1954
A. J. DAHMS
2,698,166
CLAMPING MEANS FOR FEEDER ROTOR SEGMENTS
Filed Aug. 14, 1953
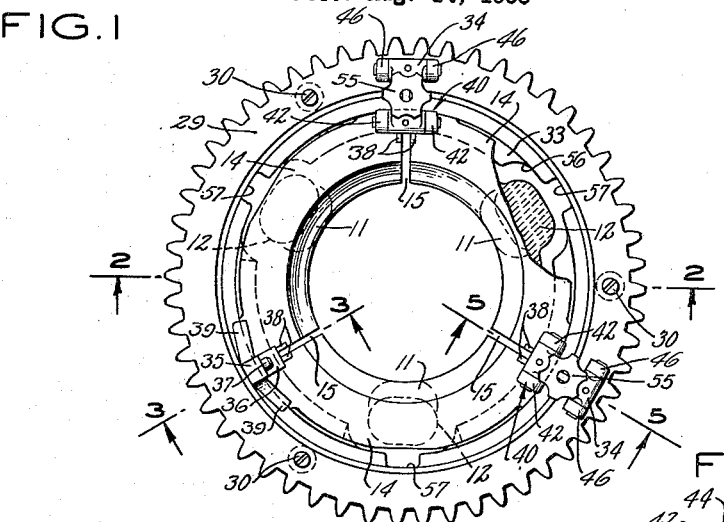
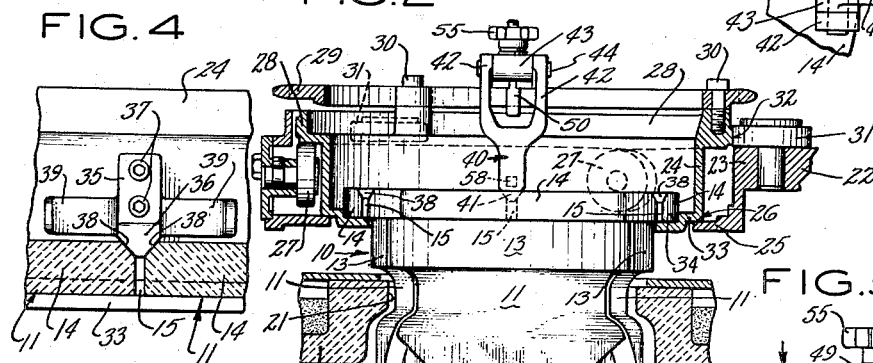
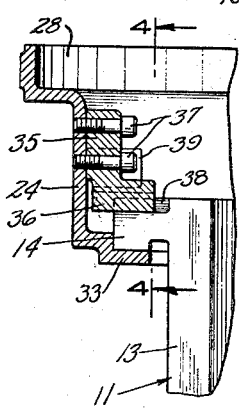
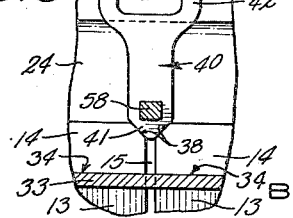
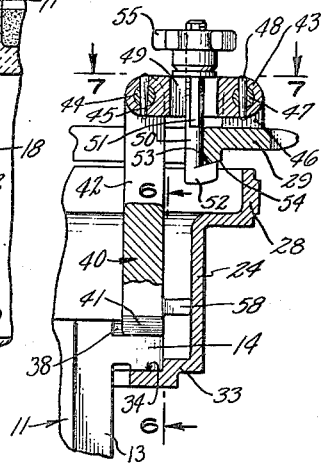
INVENTOR
ARTHUR J. DAHMS
BY *Bates & Willard*
ATTORNEYS

United States Patent Office 2,698,166
Patented Dec. 28, 1954

2,698,166

CLAMPING MEANS FOR FEEDER ROTOR SEGMENTS

Arthur J. Dahms, Glastonbury, Conn., assignor to Emhart Manufacturing Company, Hartford, Conn., a corporation of Delaware Application August 14, 1953, Serial No. 374,303

10 Claims. (Cl. 259—134)

This invention relates to improvements in clamping means for releasably holding in place the arcuate segmental sections of the refractory rotor of a glass feeder of the type known as the Hartford 81 feeder, an example of which is disclosed in U. S. patent application, Serial No. 88,869, filed April 21, 1949, on which U. S. Patent No. 2,654,184 issued on October 6, 1953.

In the feeder referred to, the rotor comprises a plurality of co-operative segmental sections, customarily three, each of which has a cylindrical upper end portion of slightly less than 120°, provided with an external flange fitting in a suitably configured seat in an individual rotor chuck segment and clamped thereto by a suitable arcuate hold-down plate segment which is secured to the chuck segment by eye bolts. Each chuck segment fits in an appropriate portion of an annular seat in the lower part of an annular rotary chuck carrier which has an outwardly enlarged supporting upper portion resting upon supporting rollers which occupy relatively fixed positions.

According to the present invention, the external flanges on the upper end portions of the segmental sections of the rotor bear directly upon appropriate portions of the suitably configured seat in the lower part of the annular rotary carrier and are clamped securely but releasably thereto by the cooperative action of clamping wedges which engage with adjacent ends of the adjacent rotor section flanges. One of these wedges may be fixed to the rotary carrier and the additional wedge or wedges—the number being determined by the number of segmental sections of which the feeder rotor consists—are movable. The movable wedge or wedges may be carried by means mounted on a rotary driven ring member that is fixed in place upon and in axial alignment with the rotary segmental section carrier so as to be positionable in lowered segmental section clamping position and manually raisable therefrom at will. The movable wedge or wedges may be retained in clamping position by associate latching means.

The novel clamping means of the present invention is relatively simple in construction, can be operated quickly and easily, and includes no loose parts to be lost when operated to release the feeder rotor segments for removal and replacement. Such threadedly engaged parts as are included therein are out of direct heat from the feeder and hence will not be "frozen" together. Moreover, the feeder rotor segments when clamped in place in their rotary carrier will be positively held in place and cannot shift angularly in their carrier on rotation of the latter in either of opposite directions about its axis.

Further advantages and objects of the invention will hereinafter be pointed out or will become apparent from the following description of a practical embodiment thereof as shown in the accompanying drawings, in which:

Fig. 1 is a plan view showing the rotor segments clamped in place in their rotary carrier by clamping means of the present invention and showing an annular sprocket for rotating the carrier and on which movable elements of the clamping means are mounted, one of the segments of the feeder rotor being partially cut away at its upper marginal portion to expose parts located therebeneath;

Fig. 2 is a transverse vertical section along line 2—2 of Fig. 1 through the assembly shown in Fig. 1, through an annular supporting structure for the rotary carrier of the feeder rotor segments, and through a fragmentary portion of a feeder bowl or spout into which the rotor depends, the rotor being shown in side elevation;

Fig. 3 is a relatively enlarged vertical section along the line 3—3 of Fig. 2;

Fig. 4 is a fragmentary sectional view along the line 4—4 of Fig. 3;

Fig. 5 is a relatively enlarged fragmentary sectional view along the line 5—5 of Fig. 1;

Fig. 6 is fragmentary sectional view along the line 6—6 of Fig. 5; and

Fig. 7 is a fragmentary sectional view along the line 7—7 of Fig. 5.

A feeder rotor generally designated 10 in Fig. 2 comprises three similar segmental sections 11, each having an outwardly offset rod-like lower end portion 12 and an outwardly offset upper end portion 13 of cylindrical configuration formed adjacent to its upper extremity with an outturned flange 14 thereon. The sections 11 of the feeder rotor are made of suitable refractory material. In the example shown in which the rotor 10 comprises three of such sections, the cylindrical portion of each section 11 is slightly less than 120° so that a narrow vertical gap or space indicated at 15, in Figs. 1, 2 and 4, is provided between adjacent side edges of the cylindrical portions of each two adjacent rotor sections when the sections of the rotor are arranged in a circle as shown in Figs. 1 and 2 and are supported in this assembled relation by means presently to be described.

The feeder rotor is adapted for use in a feeder bowl or spout, a fragmentary portion which is shown in Fig. 2 and indicated generally at 16. Such a feeder bowl or spout may comprise a refractory bottom 17, and a glass-retaining refractory side wall 18, and have a bottom outlet structure indicated at 19 through which glass may be fed in the operation of the feeder. The depending glass stirring lower end portions 12 of the rotor sections are supported for movements in the glass in bowl or spout 16 in a circle around the upper end of the outlet structure 19 when the rotary has been installed therein and is being operated in the manner and for the purpose intended. A feeder bowl or spout cover structure, indicated at 20 in Fig. 2, has an opening 21 therein, located above and in line with the outlet structure 19 and of suitable size and shape to accommodate with but slight clearance intermediate portions of the assembled rotor sections extending therethrough when the rotor is suspended from above in its operating position as shown in Fig. 2. The feeder bowl or spout and its cover structure do not, per se, form part of the present invention and may be of any suitable or preferred structural arrangement.

The diameter of the portion of the rotor located above the feeder bowl or spout cover 20 may be slightly larger than the diameter of the upper end of opening 21 through which the rotor sections depend when the rotor sections are assembled as shown in Fig. 2 and are supported by means which will now be described.

Such supporting means comprises a normally stationary structure 22 having a general cylindrical portion 23 located at a predetermined distance above the feeder bowl or spout cover in vertical alignment with the opening 21 in the feeder bowl or spout cover and with the feeder outlet structure 10. A cylindrical rotary carrier 24 for the feeder rotor sections is centered in the cylindrical supporting element 23 which may be formed with an inturned flange 25 at its lower end on which the annular carrier 24 may rest lightly as indicated at 26 in Fig. 2. This contact however, is not sufficient to prevent practically friction-free rotation of the carrier 24 about its vertical axis when the carrier is supported for such rotation by suitable anti-friction means, as by rollers 27 carried by supporting structure 22 and located beneath and in supporting relation to an outturned upper end portion 28 of the rotary carrier 24. A suitable number, as for example three, of the rollers 27 may be provided and spaced angularly around the vertical axis of the carrier 24, each of such rollers being freely turnable about a horizontal axis. A driven member for rotating the carrier 24, shown as an annular or ring sprocket 29, rests upon and is fastened to the carrier 24 in axial alignment therewith, as by cap screws 30 or other suitable fastening means. Rollers 31, rotatable about vertical axes, may bear, as indicated at 32 in Fig. 2 for one of these rollers, against the outer periphery of the upper end portion 28 of annular carrier 24 so as to center the carrier properly and prevent any side movement thereof under pull from a chain (not shown) in driving engagement with sprocket 29. The means for rotatably supporting and driving the rotor carrier 24 may vary widely from the particular means just described and the details thereof, per se, do not form part of the invention.

The rotor carrier 24 is formed with an inturned flange 33 at its lower end. This flange may be stepped downwardly from its inner marginal edge for part of its radial extent to provide an annular seat, indicated at 34, for the reception of the outturned flanges 14 on the upper ends of the rotor sections. The rotor sections thus will be supported in a circular series when their outturned flanges 14 have been placed on their respective portions of the supporting seat 34 on the flange 33 of annular carrier 24. The means for clamping these rotor sections in place and which forms the subject of the present invention will now be described. A rigid clamping member 35 having a tapering or wedge-shaped lower end portion 36 is fixed, as by cap screws 37, to the inner side of annular carrier 24 so that the opposite sides of the wedge 36 will be engaged by oppositely beveled surfaces 38 on the adjacent ends of two of the rotor sections 11 when such sections are placed with their supporting flanges on the seat 34 of the carrier 24 and are shoved thereon toward each other and against the wedge 36, as to the positions best seen in Fig. 4. The clamping member 35 may be formed with laterally extending integral wing elements or arms 39 which may serve as stops to prevent misplacing the rotor sections with their flanges 14 too far out in carrier 24 to fit in seat 34. Once fastened to the annular carrier 24, as in the manner described, the clamping member 35 will remain fixed in place thereon.

Co-operative with the fixed clamping member 35 to maintain the rotor sections in place are movable clamping members 40, the number of which will be determined by the number of rotor sections. There will be two of these movable clamping members 40 when the rotor comprises three segmental sections, as in the example shown. Each movable clamping member 40 has its lower end portion 41 formed with tapering side surfaces so as to provide a wedge, as in the case of the fixed clamping member. The upper end portion of each clamping member 40 may be formed to provide a pair of spaced attaching elements or forks 42 which straddle one end portion of a link 43 and are pivotally connected therewith by a horizontal pivot pin 44. The pivot pin 44 may be retained against accidental displacement by a pin 45 or in any other suitable known manner. The opposite end of link 43 extends between a pair of upstanding ears or lugs 46 on the rotary sprocket 29 and is fastened thereto by a horizontal pivot pin 47. The pivot pin 47 may be retained against accidental displacement by a pin 48 or in any other suitable known manner.

With the arrangement just described, each of the movable clamping members 40 will be pivotally suspended within the annular carrier 24 and it will be understood that the relative locations of the pairs of ears or lugs 46 and the fixed clamping member 35 are such that each movable clamping member 40 will be located appropriately for engagement of the wedge element 41 with the bevel surfaces 38 on its adjacent ends of two adjacent rotor sections when all the rotor sections are assembled in a circular arrangement in the carrier 24. Thus, when there are three rotor sections, the movable clamping members 40 will be spaced 120° from each other and each will be spaced 120° from the fixed clamping member 35.

The link 43 is provided with a straight-sided vertical slot 49 of substantial length intermediate its ends. A latch member 50 has a flattened shank portion 51 extending through and slidably contacting with the side walls of the slot 49. The arrangement is such that the latch member 50 may be moved slidably along the slot 49 and to a limited extent vertically therein. The latch member 50 has its lower end formed as a hook 52, the bill portion of which may be inclined at its upper surface as indicated at 53, Fig. 5, for engagement with the complementarily inclined surface 54 on the bottom edge of the adjacent portion of rotor sprocket 29 when the latch member is in its engaged position as best seen in Fig. 5. The upper end portion of the latch shank is provided with screw threads and is engaged by a nut 55 which bears on the upper face of the slotted link 43 and can be turned to raise the latch member until its hook portion is firmly engaged with the bottom edge of the sprocket 29 or to permit the latch member to descend until the hook portion thereof is free to be moved radially inward beyond the inner periphery of the sprocket 29 when the latch member is slid inwardly along slot 49 in link 43.

The operation of engaging a movable clamping member 40 with the rotor sections to be secured in place thereby and to release this wedge member from such sections when desired will be obvious from the foregoing description of the parts involved. When the latch member 50 has been slid in the slot 49 of link 43 until the latch hook is inwardly of the inner periphery of the rotor sprocket 29, the inner end of link 43 and the clamping member 40 suspended therefrom may be lifted by means of the nut 55 and the latch member 50 and swung upwardly and outwardly about the axis of pivot pin 47 beyond the confines of the carrier 24 of the feeder rotor sections. When the movable clamping members 40 have been swung to their out-of-the-way, inactive positions, the rotor sections may be lifted from the carrier for replacement or repair. In this connection it will be noted that the bottom flange 33 of rotor carrier 24 may be partly cut away at appropriate places around its inner periphery as indicated at 56 in Fig. 1, to provide clearance for the outwardly offset rod-like lower portions of the rotor segments when the segments are lifted from the carrier. A further cut-out as indicated at 57, Fig. 1, may be provided at the outer side of each cut-away portion 56 to permit use of a suitable tool (not shown) to aid in effecting removal of a rotor section.

When the rotor sections have been replaced and are to be secured in place in their rotary carrier 24, each movable clamping member 40 is lowered in turn until its wedge portion bears against the beveled surfaces 38 of the adjacent ends of two adjacent rotor sections. The latch member 50 of that clamping assembly is then slid outwardly in the slot 49 of its link 43 until the bill of such latch member is underneath the overlying bottom edge of the rotor sprocket 29. Each clamping member 40 may be provided with a spacing lug or projection 58 thereon adjacent to its lower end for contact with the inner side of the annular carrier 24 to position the depending clamping member 40 suitably to engage its wedge with the ends of the two adjacent rotor sections.

Tightening of the nuts 55 will raise the latch members 50 into engagement with the bottom edge of sprocket 29 and concurrently force the wedge portions 41 of the movable clamping members downwardly between the oppositely inclined or beveled surfaces 38 of the adjacent ends of adjacent rotor sections in the annular carrier 24. Consequently, the rotor sections will be clamped firmly in place in their carrier for rotation therewith.

Various changes in and modifications of the illustrative embodiment of the invention shown in the drawings and herein particularly described will now be obvious to those skilled in the art and I therefore do not wish to be limited to the details of such embodiment.

I claim:

1. In a glass feeder, the combination with a rotary annular carrier supported with its axis vertical and having an inturned supporting flange at its lower end, of a rotor comprising a plurality of segmental sections, each depending through the annular carrier adjacent to the inner edge of the inturned supporting flange of the carrier and provided with an outturned supporting flange resting upon said inturned flange of the carrier, and clamping means comprising wedges corresponding in number with the segmental sections of the rotor and means mounting said wedges on the rotary carrier for rotation therewith and so that the individual wedges are in wedging engagement with adjacent ends of the outturned flanges of adjacent segmental sections of the rotor supported by the rotor carrier.

2. The combination defined by claim 1 wherein one of said wedges is fixed to the inner wall of the rotary annular carrier in position to depend toward the underlying portion of the inturned supporting flange of the carrier to a level below the plane of the upper surfaces of the outturned flanges of the rotor sections supported by the carrier.

3. The combination defined by claim 1 wherein the segmental sections of the rotor are more than two in number and wherein one of said wedges is located at a fixed position on the inner wall of the rotary carrier and the other wedges are mounted for movements relative to the carrier between lowered rotor segment clamping positions and raised positions out of engagement with said rotor segments.

4. The combination defined by claim 1 wherein the ends of the outturned flanges of the rotor segmental sections are beveled at the places which are engaged by said wedges.

5. The combination in a glass feeder of a rotary annular carrier supported with its axis vertical and having an inturned flange at its lower end, a rotor depending through said carrier and comprising a plurality of segmental sections, each provided with an outturned flange adjacent to its upper end resting upon said inturned flange of the carrier, a vertical wedge fixed to the inner wall of said carrier in position to be engaged with the adjacent ends of the outturned flanges of two adjacent rotor sections when such sections have been shifted angularly in said carrier against said fixed wedge, a second vertical wedge connected to the annular carrier to rotate therewith and mounted for bodily movements relative to the carrier between a lowered position in wedging engagement with one end of the flange of the third rotor section and the adjacent end of the flange of one of the two first mentioned rotor sections and a raised position clear of said rotor sections, and a third vertical wedge like the second and similarly connected and mounted but positioned for bodily movements between a lowered position in wedging engagement with the second end of the flange of the third rotor section and the adjacent end of the flange of the second of the two first mentioned rotor sections and a raised position clear of said rotor sections.

6. The combination defined by claim 5 wherein the ends of the flanges of said rotor sections are beveled at the places engaged with said wedges.

7. The combination defined by claim 5 and in addition individual latching devices associated with the bodily movable second and third wedges and each operable to releasably secure the associate wedge firmly in its lowered, rotor section engaging position.

8. The combination in a glass feeder of a rotary annular carrier supported with its axis vertical and having an inturned flange at its lower end, a rotor depending through said carrier and comprising three segmental sections, each provided with an outturned flange adjacent to its upper end resting upon said inturned flange of the carrier, a vertical wedge fixed to the inner wall of said carrier in position to be engaged with the adjacent ends of the outturned flanges of two adjacent rotor sections when such sections have been shifted angularly in said carrier against said fixed wedge, an annular driving member on the annular carrier fixed thereto in axial alignment therewith, second and third wedges, individual links swingingly suspending said second and third wedges from said annular driving member respectively for bodily movements between lowered positions in wedging engagement with the opposite ends of the third rotor section flange and the adjacent ends of the first mentioned two rotor section flanges and raised positions clear of the rotor sections, and individual latching means carried by said links for engagement with said annular driving member releasably to hold said second and third wedges in their lowered, wedging positions, and operable at will to release said second and third wedges to permit raising thereof.

9. The combination defined by claim 8 wherein said rotor sections have outwardly offset lower end portions and the inturned supporting flange of the annular carrier is cut away at angularly spaced places to permit upward movement therethrough of said lower end portions of the rotor sections when said sections are moved upwardly through said carrier.

10. The combination defined by claim 8 wherein said links are slotted intermediately and the latching means associated with each link comprises a rigid shank having a flat sided portion extending slidably through the slotted portion of the link, a hook at the lower end of the shank engageable under the annular driving member when the shank is in one position and disengageable therefrom when the shank is in a different position, and a nut threadedly engaged with the upper end portion of the shank and bearing on the link so as to be operable at will to retain the shank in its first named position or to permit movement of the shank to its said different position.

References Cited in the file of this patent

UNITED STATES PATENTS

| Number | Name | Date |
|---|---|---|
| 2,305,739 | Shackelford | Dec. 22, 1942 |
| 2,654,184 | Peiler | Oct. 6, 1953 |